Dec. 12, 1972  R. E. SAYRE ET AL  3,705,831
METHOD OF FABRICATING AN INSULATED STORAGE BIN
Filed July 9, 1971
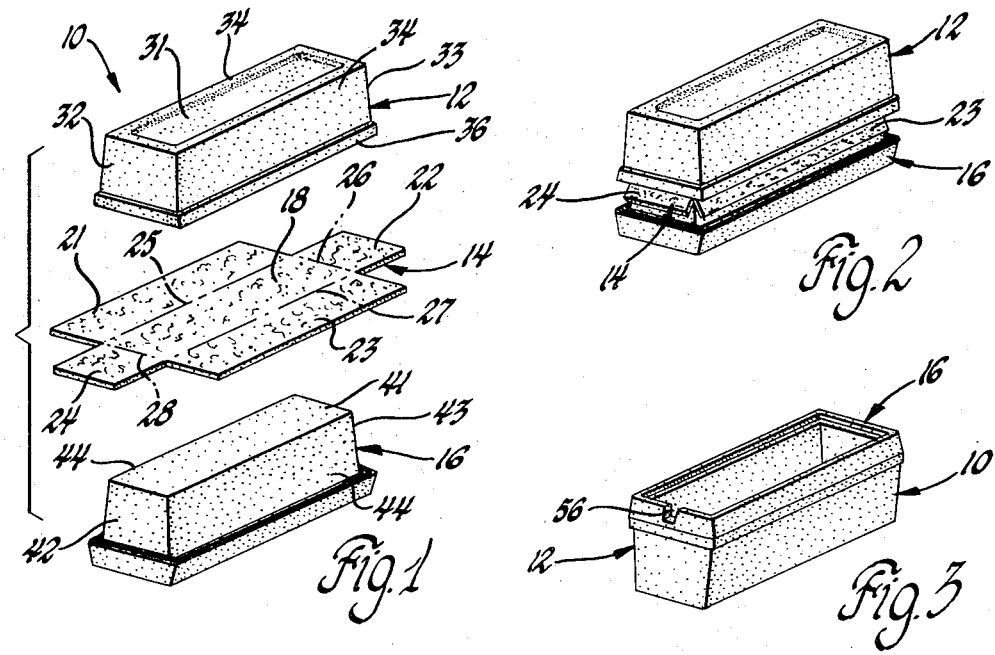
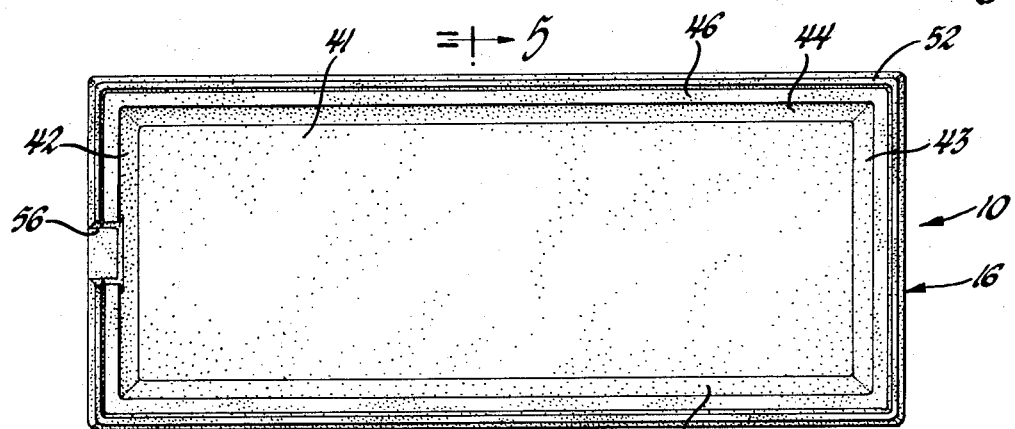
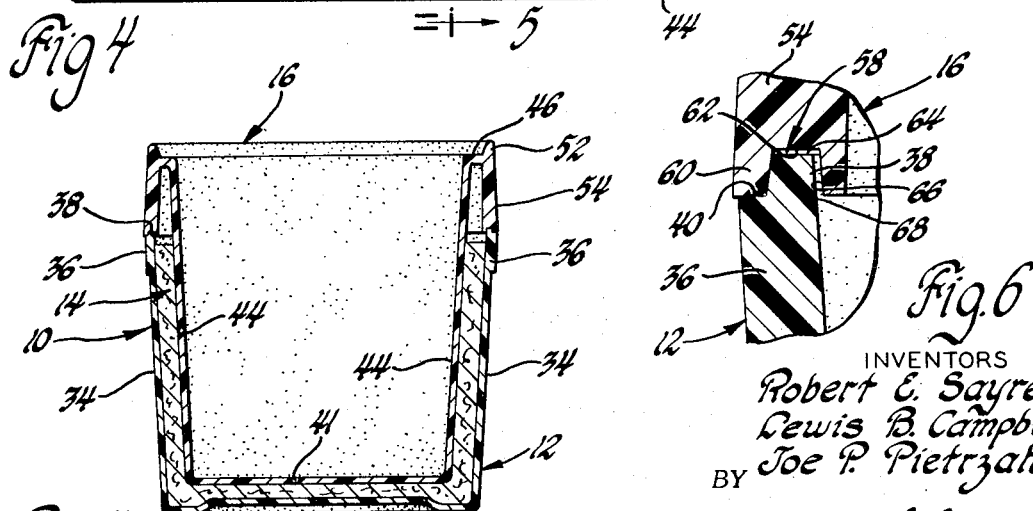
INVENTORS
Robert E. Sayre,
Lewis B. Campbell &
BY Joe P. Pietrzak
Edward P. Barthel
ATTORNEY United States Patent Office 3,705,831
Patented Dec. 12, 1972

3,705,831
METHOD OF FABRICATING AN INSULATED STORAGE BIN
Robert E. Sayre, Centerville, Lewis B. Campbell, Miamisburg, and Joe P. Pietrzak, Kettering, Ohio, assignors to General Motors Corporation, Detroit, Mich.
Filed July 9, 1971, Ser. No. 161,056
Int. Cl. B31f 1/00
U.S. Cl. 156—227
2 Claims

ABSTRACT OF THE DISCLOSURE

A method of making an insulated double walled storage bin including the assembly of insulation material between an inner liner and outer shell of the bin, wherein an insulation batt is precut into a flexible blank to define a rectangular center section having side and end panel extensions. The inner liner of the bin is first inverted and the insulation blank placed with its center section aligned on the bottom wall of the liner such that by telescoping the outer shell over the liner the blank panels are simultaneously folded about imaginary boundaries to a position generally normal to the center section to occupy the space therebetween. The liner and shell have a scarf-like joint on their mating edges which is sealed and bonded by means of a cement material maintaining the insulation blank in its distorted condition therebetween.

---

This invention relates to the fabrication of insulated ice storage bins for use both within and without domestic refrigerators or the like and has for its object to provide a method of installing a flexible batt of insulation material between the inner liner and outer shell of the bin which is economical and provides an effective insulation and maintaining the batt between the liner and shell in distorted condition by means of a sealed joint structure.

According to the invention, a method of installing a batt of flexible insulation material between a plastic inner liner and outer shell of an ice cube storage bin or other structure which consists in providing the upper edge of the liner with an outer depending skirt-like flange such that the lower edge of the depending flange has a channel which receives a continuous tenon formed on the upper edge of the shell side walls when the shell is telescoped over the liner to form an insulating space therebetween. The method includes inverting the inner liner and locating the insulation batt, formed into a flat blank having a center section and pairs of side and end panel extensions, such that the center section is aligned on the bottom wall of the liner after which the outer shell is inverted and has its free tenon edge dipped in a pool of solvent cement. The shell is then telescoped over the insulation blank and liner causing the side and end panels of the blank to simultaneously conform and occupy the air space therebetween and maintaining the insulation batt in its distorted condition between the shell and liner by means of a continuous scarf-like tenon and channel joint on the mating edges of the depending flange and upper edge of the outer shell which is sealed in a continuous manner by the solvent cement to form the finished insulated ice storage bin.

These and other objects and advantages of the present invention will be readily apparent from the following detailed description of a preferred embodiment thereof which when taken in connection with the accompanying drawings in which:

FIG. 1 is an exploded view in perspective of the insulation ice storage bin provided by the approved method.

FIG. 2 is a perspective view of the elements partially telescoped during assembly.

FIG. 3 is a perspective view of one form of the completed insulation bin.

FIG. 4 is a top elevational view of the assembled bin.

FIG. 5 is a section taken on line 5—5 of FIG. 4.

FIG. 6 is an enlarged view cross section of the interlocking joint shown in FIG. 5.

Referring now to the drawings, and more particularly to the exploded view of FIG. 1, there is shown an unassembled ice storage bin 10 which incorporates an outer shell 12, an insulating batt in the form of a flexible flat blank 14 and an inner liner 16 which provides the actual enclosure within which ice pieces are stored. The shell 12 and liner 16 are shown inverted preparatory to their assembly for reasons to be explained.

In the preferred form, the insulation blank 14 is precut from a flexible batt of insulating material into a rectangular flat center section or panel 18 and first panel 21, second panel 22, third panel 23 and fourth panel 24 on the four sides of the center section. The panels are separated from the center section by generally straight first, second, third and fourth imaginary boundaries or fold lines 25, 26, 27 and 28 respectively. Thus, the blank is separated into a pair of side panel extensions 21, 23 together with a pair of end panel extensions 22, 24 located on either end of the center section 18. The flexible insulation blank 14 is preferably formed of low density fiberglass manufactured by Owens-Corning under the designation TF-335 having a thickness of approximately one-half inch. The insulation blank, however, could be formed from other flexible insulating material such as spun glass, blown glass or fibrous ceramic without departing from the scope of the invention. The thickness of the insulation blank to be used will, of course be determined by the volume of the space to be filled which in turn will be determined by the relative size or form of the shell and liner.

The outer shell 12 is rectangular in plan with an open top and is preferably molded from a high strength plastic such as ABS plastic (acrylonitrile butadiene styrene), high density polyethylene, polystyrene or other suitable material. Liner 12 includes a bottom 31, a front wall 32, a rear wall 33, and side walls 34. As best seen in FIG. 5 the walls 32, 33 and 34 have thickened rim portions 36 integrally molded with a continuous upstanding spline or tenon 38 formed by a peripheral rabbeting notch or recess 40 located on the outer edge of the thickened portion 36 of walls 32, 33 and 34 as shown in the enlarged view of FIG. 6.

The inner liner 16 of the bin assembly is molded in a generally rectangular shape preferably from the same material as the shell 12 and includes a bottom 41, a front wall 42, a rear wall 43 and side walls 44. The liner walls have a continuous ledge therearound formed by upwardly facing horizontal flange 46 bordered around its outer periphery by an upwardly extending lip 52 and a downwardly directed skirt or flange 54. In one end wall 42 and its associated ledge 46, lip 52 and skirt 54 a downwardly extending opening 56 is provided as seen in FIG. 4 for clearance for an operating handle of an ejector type ice tray, for example, as shown in U.S. Pat. No. 3,355,138 issued Nov. 28, 1967 to A. J. Frei, Jr. et al.

The downwardly facing edge of the skirt 54 has a continuous channel or groove 58 formed therein which is dimensioned so as to have a greater width and depth than the outer shell tenon 38 adapted to be received therein to form a scarf-like joint, the joint sealed by a suitable cementing solvent of known commercial type that causes the surfaces to be joined to go into solution such that during cure, the solvent is evaporated to make a homogenous joint. It should be noted that other bonding means such as dope or chemical adhesive cements could be used without departing from the scope of the invention.

As seen in FIG. 6 the outer spline portion 60 formed by channel 58 bottoms or butts on notch 40 to provide a clearance between the opposed bottom surface 62 of channel 58 and upper surface 64 of tenon 38. Also, a substantially vertical clearance is provided between the outwardly facing channel wall 66 and the inwardly facing tenon wall 68. In the preferred form the approximate width of tenon 38 is .070 inch and the approximate width of channel 58 is .080 inch resulting in lateral clearance of the order of .010 inch. The approximate height of tenon 38 is .060 inch and the approximate depth of channel 58 is .065 inch, resulting in a vertical clearance of the order of .005 inch.

The first step in the method of assembling the insulated bin is to invert the inner liner 16 on a suitable work surface. The insulation blank 14 is then properly positioned on the outer surface of bottom wall 41 of the liner such that the central section 18 is aligned on the bottom wall 41 in laterally and longitudinally flush relationship to the outer side walls 44 and edges of end walls 42, 43.

With the insulation blank 14 supported on the liner bottom wall 41 the outer shell 12 is inverted and its tenon 38 is dipped in a pool of solvent cement after which the shell 12 is telescoped over the liner 16 and insulation blank 14 (FIG. 2) causing the side and end panels 21, 22, 23 and 24 of the blank to be simultaneously folded downwardly about their associated imaginary score lines 25, 26, 27 and 28 such that the blank conforms with the inner liner 16 and occupies the air space between the opposed walls of the liner and shell, and maintaining the insulation batt in its distorted condition by the sealing of the shell tenon 38 into the liner channel 58. The design of the scarf-like joint allows excess solvent cement to flow through the upper and inner clearance portions of the joint to the inner surface 68 of the liner to insure a clean seal on the outer walls of the assembled bin to prevent the ingress of moisture while enhancing the appearance and salability of the product.

The disclosed method provides a process whereby an insulated bin may be readily and economically manufactured to provide a relatively high degree of insulation against the transfer of heat and cold therethrough because of the sealed air space between the walls of the outer shell and inner liner together with the placement of insulation material in the space.

What is claimed is:

1. In the manufacture of an insulated double walled bin assembly of rectangular plan including an outer shell and an inner liner spaced a predetermined distance from said outer shell, said inner liner having a continuous peripheral outwardly directed ledge being provided with a depending integral skirt and means defining a downwardly opening continuous groove on said skirt, said shell having its upper rim formed with a continuous notch on its outer edge forming an upstanding tenon adapted to form a scarf-like joint with said groove upon axial telescoping movement of the liner with respect to the shell, and a precut flat flexible blank of insulating material including a center rectangular section having side and end panel extensions separated from said center section by imaginary boundaries, the method comprising the steps of: orienting said liner in an inverted position, positioning the center section of said blank of insulating material in alignment with the outer surface of the bottom wall of said liner in laterally flush relationship to the outer edges of said bottom wall; inverting said outer shell and dipping said tenon in a cement material; telescoping said outer shell over said liner whereby said blank side and end panels are simultaneously folded along their imaginary boundaries at substantially right angles to said center section so as to be positioned in the space between said liner and said shell; and maintaining said flexible insulation blank in its folded condition by having said tenon being received in said groove, said cement material sealing and bonding said outer shell and inner liner together.

2. The method claimed in claim 1, wherein the groove is formed having a width and depth greater than the width and height of said tenon whereby the outwardly facing surface of said tenon and the inwardly facing surface of said groove are placed in contact and whereby the bottom surface and outwardly facing surfaces of said groove are spaced from said tenon to provide clearance for inward flow of said cement upon forming said scarf-like joint.

References Cited
UNITED STATES PATENTS

| | | | |
|---|---|---|---|
| 2,133,833 | 10/1938 | Sampson | 156—245 X |
| 2,149,507 | 3/1939 | Camfield | 156—214 X |
| 3,120,570 | 2/1964 | Kennedy et al. | 215—13 UX |
| 3,214,830 | 11/1965 | Piker | 215—13 X |
| 3,511,902 | 5/1970 | Santangelo | 264—259 X |
| 3,560,293 | 2/1971 | Piker | 264—263 X |

RALPH S. KENDALL, Primary Examiner

D. A. SIMMONS, Assistant Examiner

U.S. Cl. X.R.

156—214; 215—13; 264—263